Jan. 30, 1945.  G. A. LYON  2,368,244
WHEEL STRUCTURE
Filed June 2, 1943
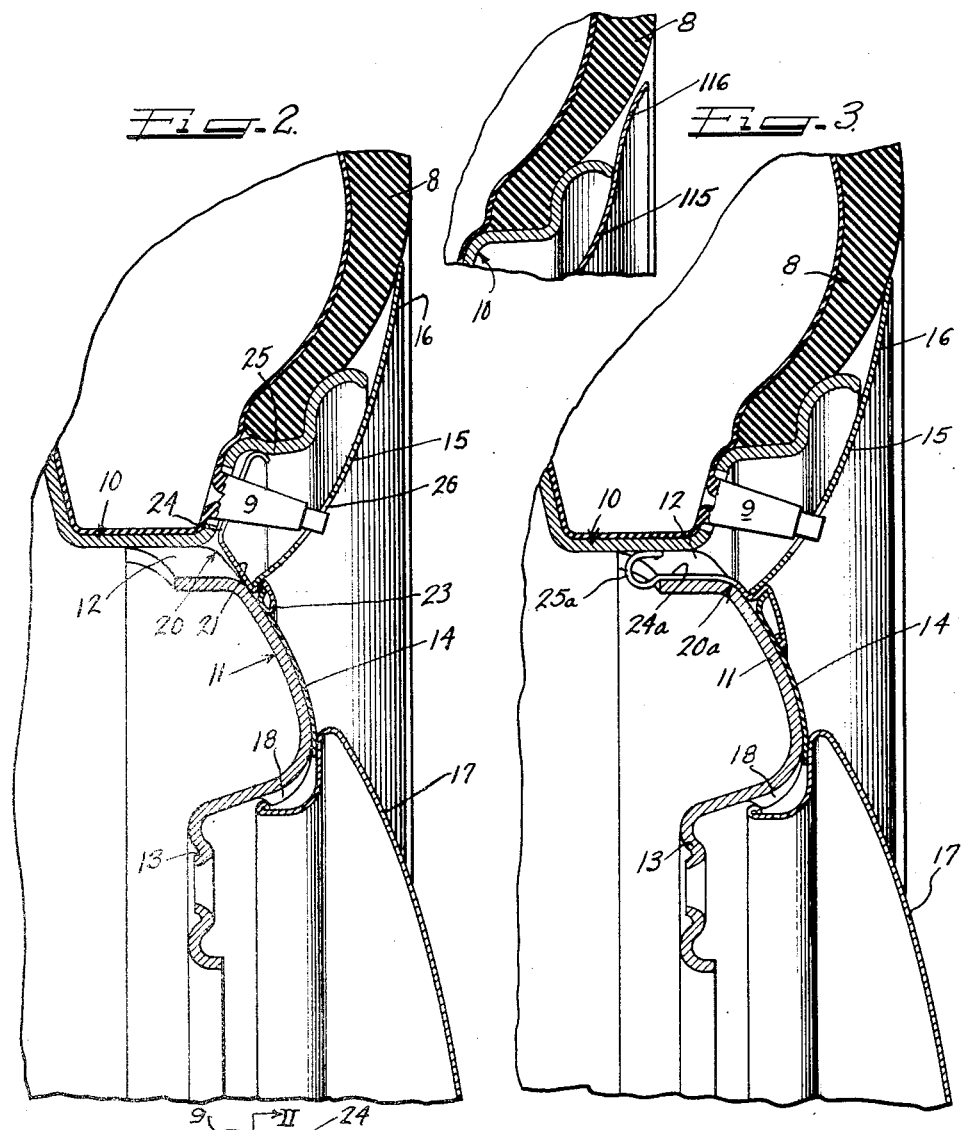
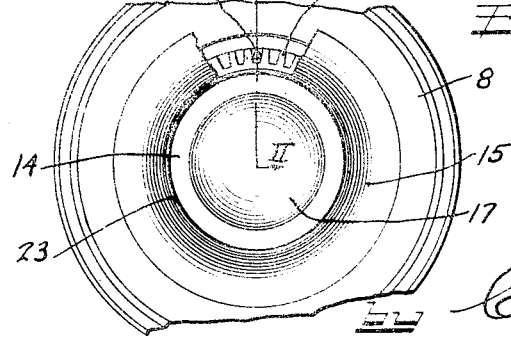

Patented Jan. 30, 1945

2,368,244

UNITED STATES PATENT OFFICE 2,368,244

WHEEL STRUCTURE

George Albert Lyon, Allenhurst, N. J.

Application June 2, 1943, Serial No. 489,310

7 Claims. (Cl. 301—37)

This invention relates to wheel structures, and more particularly to a novel multiple section cover for a wheel and novelly arranged retaining means therefor.

An object of this invention is to provide a highly ornamental cover made up of a plurality of sections and having cover retaining means which not only holds the cover in place but also holds the sections together.

Still another object of the invention is to use cover retaining means as a means of concealing a joint between cover sections and ornamenting the cover.

In accordance with the general features of this invention there is provided in a wheel construction including a multiple flanged tire rim and a wheel body connected thereto a wheel covering structure comprising a plurality of concentric annular sections and cover retaining means for detachable engagement with the wheel and extending between said sections to define a seat on one section for the other and to reenforce the sections at their junction.

Another feature of the invention relates to the making of the cover sections of such contour that they blend in readily with the tire and cause the tire to appear to extend clear down to the wheel body of the wheel. That is to say the cover gives the wheel the appearance of having a huge tire and a relatively small hub part.

Another feature of the invention relates to the nesting of the sections of the cover in such a manner that the outermost section may be flexed to provide access to the valve stem or to provide access to the retaining means when it is desired to detach the cover from the wheel.

Other objects and features of this invention will more fully appear from the following detailed description taken in connection with the accompanying drawing which illustrates several embodiments thereof, and in which Figure 1 is a side elevation of a wheel showing my novel cover structure applied thereto and partly broken away to illustrate more clearly the retaining means;

Figure 2 is an enlarged fragmentary cross-sectional view taken on the line II—II of Figure 1 looking in the direction indicated by the arrows and showing clearly the manner in which the sections of my cover are retained together on the wheel by novelly arranged retaining means;

Figure 3 is an enlarged fragmentary cross-sectional view similar to Figure 2 but illustrating a modified form of structure; and Figure 4 is a fragmentary sectional view of a modified form of trim ring.

On the drawing:

The reference character 8 designates generally a conventional type of drop-center tire which is adapted to be seated in the usually way inside the flanges of a drop-center rim, 10. The tire is provided with the usual valve stem 9 extending through an aperture in a side flange of the rim and which is cooperable with my cover structure in a manner to be defined hereinafter.

The tire rim 10 of the wheel is attached at spaced intervals to a wheel body 11 blanked in the usual way from sheet metal. The wheel body member has at intervals, alternating with points of attachment to the rim, spaced openings 12 for purposes of ventilation. Also the wheel body 11 is provided with a central bolt-on flange 13 by which the wheel may be attached in the usual manner to an axle or other support.

Associated with this wheel is my novel cover which, as illustrated, embraces primarily two sections 14 and 15 which are concentrically arranged and which are nested one within the other by reason of the manner in which they are connected together. Each of these sections is made from any suitable flexible material which will not permanently distort upon being flexed. I have attained excellent results by making these sections of a resilient form-retaining material such, for example, as synthetic plastic.

The section 15 is of such a width and cross-sectional shape that it extends clear from the body part to the side of the tire so as to cause the tire to appear to extend clear to the body part. This result is enhanced by having the outer surface of the section 15 provided with a white appearance, and also by providing the section 15 with a lip 16 which, substantially intersects the side wall of the tire beyond the flanges of the rim.

The inner section 14 is of such a contour as to closely conform with the outer shape of the body part 11, as is evident from Figure 2. It is adapted to have its inner edge clamped to the wheel body part by a central hub cap 17 suitably resiliently snapped into retained engagement with bumps or shoulders 18 formed on the wheel body part 11. Such a hub cap structure has been covered in patents previously issued to me.

One of the features of the invention relates to the interconnecting of the two sections 14 and 15 by utilizing the cover retaining means which is designated generally by the reference character 20. This cover retaining means comprises an annular metallic section 21 formed with an inclined radial shoulder 22 over and behind which the inner edge of the flexible section 15 is adapted to be resiliently stretched or flexed for the purpose of anchoring the section thereto. From the shoulder 22 the metallic retaining means 20 is bent radially inwardly, defining a pocket for receiving the outer edge of the inner section 14. This radially inwardly bent portion 23 of the retaining means may be highly ornamented, such as by a lustrous finish so as to decorate and conceal the junction between the two sections 14 and 15. Obviously the inwardly turned portion 23 will serve to clamp the outer edge of the section 14 against the wheel body 11.

The outer edge of the section 21 of the retaining means is provided with a plurality of spaced retaining fingers 24 which are resiliently deflectable into engagement behind a shoulder 25 formed in one of the flanges of the tire rim 10. It should be noted that each of the fingers 24 has its outer end turned slightly so as to hug tightly the shoulder 25 when the fingers are pressed home into retained engagement with the tire rim. The action of pressing these fingers home results in the retention of the cover on the wheel and also results in holding the two sections 14 and 15 in interlocked engagement. In addition, the highly lustrous finish on the radially inner portion 23 of the retaining means serves to decorate and conceal the joint between the two sections.

Access may be had to the retaining fingers 24 for the purpose of prying them free of the rim when it is desired to move the cover by first flexing the section 15 outwardly away from the wheel. This flexure of the section 15 may be also utilized for the purpose of getting to the valve stem should it be desired to apply the valve stem hose to the rear of the section. On the other hand, the section 15 may if it is so desired be provided with an opening 26 about the valve stem. In this arrangement the valve stem may be rendered accessible by slightly indenting the flexible ring section 15 around the valve stem opening 26.

In the modification illustrated in Figure 3, the same reference numerals are employed as in Figure 2 to designate parts that correspond identically to those described in Figure 2. The reason for this is that the principal difference between this modification and the first described form resides in the connecting means. In this modification, the connecting means is designated generally by the reference character 20a and is at its outer side substantially like the connecting means 20 in so far as the connection of the two sections 14 and 15 together are concerned. The principal difference between this connecting means and the first described one resides in the fact that the fingers 24a instead of engaging the side flanges of the rim extend into the wheel openings 12. Each of the fingers 24a has a rearwardly hooked end 25a, which is adapted to be wedged between the edge of the wheel body 11 and the base of the rim flange to the rear of the wheel opening 12. Otherwise this form of the invention operates and functions in substantially the same way as the previously described embodiment.

In both forms the means for detachably retaining the cover on the wheel also serves as a means for holding the two concentric or nested flexible sections 14 and 15 together, as well as for concealing the joint between the sections. Also in both forms the connecting means at the junction comprises an ornamental band which dresses up the appearance of the wheel cover. For example, if the connecting means is made of an annulus of stainless steel, it will be appreciated that a highly ornamental effect may be secured and at the same time the requisite resiliency may be provided for in the fingers utilized for detachably holding the wheel cover on the wheel.

In Figure 4 I have illustrated a modified form of cover which is the same as the others before described except that the ring section 115 has a slightly axially outwardly turned lip portion 116 arranged so the extreme outer edge of this section does not normally bear against the tire. The lip portion 116, as shown, may, however, bear against the edge of the wheel rim part. This modification is advantageous since it tends to minimize wear as between such edge and the tire wall. This feature can be used with advantage in all embodiments of my invention.

Also in all forms the resilient self-sustaining character of the material used in the cover causes the cover to spring back toward its predetermined normal contour after any manual deflection of same. Thus the outer free lip portion is always inherently urged to its proper and normal shape without any external assistance and without the necessity of confining or restraining such lip portion.

I claim as my invention:

1. In a wheel construction including a multiple flanged tire rim and a wheel body connected thereto, a wheel covering structure comprising a plurality of concentric annular sections for disposition over said rim and body respectively, and cover retaining means for detachable engagement with the wheel and extending between adjacent edges of said sections to define a seat on one section for the other and to reenforce the sections at their junctions.

2. In a wheel construction including a multiple flanged tire rim and wheel body connected thereto, a wheel covering structure comprising a plurality of concentric annular sections for disposition over said rim and body respectively, and cover retaining means for detachable engagement with the wheel and extending between adjacent edges of said sections to define a seat on one section for the other and to reenforce the sections at their junction, said sections being made of resilient form-retaining non-metallic material and said retaining means being made of relatively stiffer material.

3. In a wheel construction including a multiple flanged tire rim and a wheel body connected thereto, a wheel covering structure comprising a plurality of concentric annular sections for disposition over said rim and body respectively, and cover retaining means for detachable engagement with the wheel and extending between adjacent edges of said sections to define a seat on one section for the other and to reenforce the sections at their junction, said sections being made of resilient form-retaining non-metallic material and said retaining means being made of relatively stiffer material, the outermost of said sections being flexible without permanently distorting the same to afford access to a valve stem or the like.

4. In a wheel construction including a multiple flanged tire rim and a wheel body connected thereto, a wheel covering structure comprising a plurality of concentric annular sections for disposition over said rim and body respectively, and cover retaining means for detachable engagement with the wheel and extending between adjacent edges of said sections to define a seat on one section for the other and to reenforce the sections at their junctions, said retaining means including finger means for snap-on engagement with the wheel rim and a grooved annulus having an annular retaining shoulder over which the inner edge of the outer section is adapted to be flexed, as well as a shoulder behind which the outermost edge of the inner section is adapted to be retained.

5. As an article of manufacture, a wheel covering structure for a wheel including a multiple flanged tire rim comprising a plurality of concentric annular sections nested one within the other, and cover retaining means projecting axially rearwardly therefrom for detachable engagement with a wheel and also extending between the inner edge of an outer section and the outer edge of an inner section to define seats for each of said edges to hold the sections together and to reenforce the sections at their junction.

6. As an article of manufacture, a wheel covering structure for a wheel including a multiple flanged tire rim comprising a plurality of concentric annular sections nested one within the other, and cover retaining means projecting axially rearwardly therefrom for detachable engagement with a wheel and also extending between the inner edge of an outer section and the outer edge of an inner section to define seats for each of said edges to hold the sections together and to reenforce the sections at their junction, said two sections being made of resilient material such as a synthetic plastic, and said retaining means being made of a more rigid material such as sheet metal.

7. In a wheel structure including a tire rim part and a central load bearing part, a cover assembly including a plurality of concentrically disposed circular cover members for concealing concentrically arranged portions of the outer side of the wheel, and retaining means including axially inner means for retainingly engaging the wheel and axially outer means extending between adjacent edges of the adjacent, concentric cover members, said axially outer means being arranged to overlie said edges of said cover members to hold the same against axial outward movement on the wheel.

GEORGE ALBERT LYON.